United States Patent [19] | [11] 4,103,159
Orthmann | [45] Jul. 25, 1978

[54] RADIOGRAPHIC METHOD AND APPARATUS

[75] Inventor: Jürgen Orthmann, Grunwald, Fed. Rep. of Germany

[73] Assignee: Agfa-Gevaert Aktiengesellschaft, Leverkusen, Fed. Rep. of Germany

[21] Appl. No.: 774,411

[22] Filed: Mar. 4, 1977

[30] Foreign Application Priority Data

Mar. 12, 1976 [DE] Fed. Rep. of Germany ....... 2610514

[51] Int. Cl.[2] ............ G03B 41/16
[52] U.S. Cl. ............ 250/315 R; 250/315 A
[58] Field of Search ............ 250/314 A, 315 R

[56] References Cited

U.S. PATENT DOCUMENTS 3,971,937 7/1976 Kinoshita ............ 250/315 A
4,002,906 1/1977 Pekau ............ 250/315 A

*Primary Examiner*—Craig E. Church
*Attorney, Agent, or Firm*—Peter K. Kontler

[57] ABSTRACT

A dielectric sheet one side of which is coated with a film of thermoplastic material is heated to the softening point of thermoplastic material prior to exposure to object-modulated X-rays in an ionography imaging chamber whose interelectrode gap is filled with a high Z gas. The thus obtained relief image on the film is cooled prior to transferring the sheet into a second gas-filled gap of the imaging chamber wherein the sheet is in register with the light source and optical elements of a device which renders the relief image visible in accordance with the schlieren optical effect. The relief image can be projected onto a web of photosensitive material to produce a permanent record of the relief image. During movement back into the interelectrode gap, the sheet is caused to pass along a corona discharge device which neutralizes its charge, and the sheet is heated to the softening point of the thermoplastic material to erase the preceding relief image and to render the sheet ready for exposure to X-rays which are modulated by another object.

17 Claims, 1 Drawing Figure

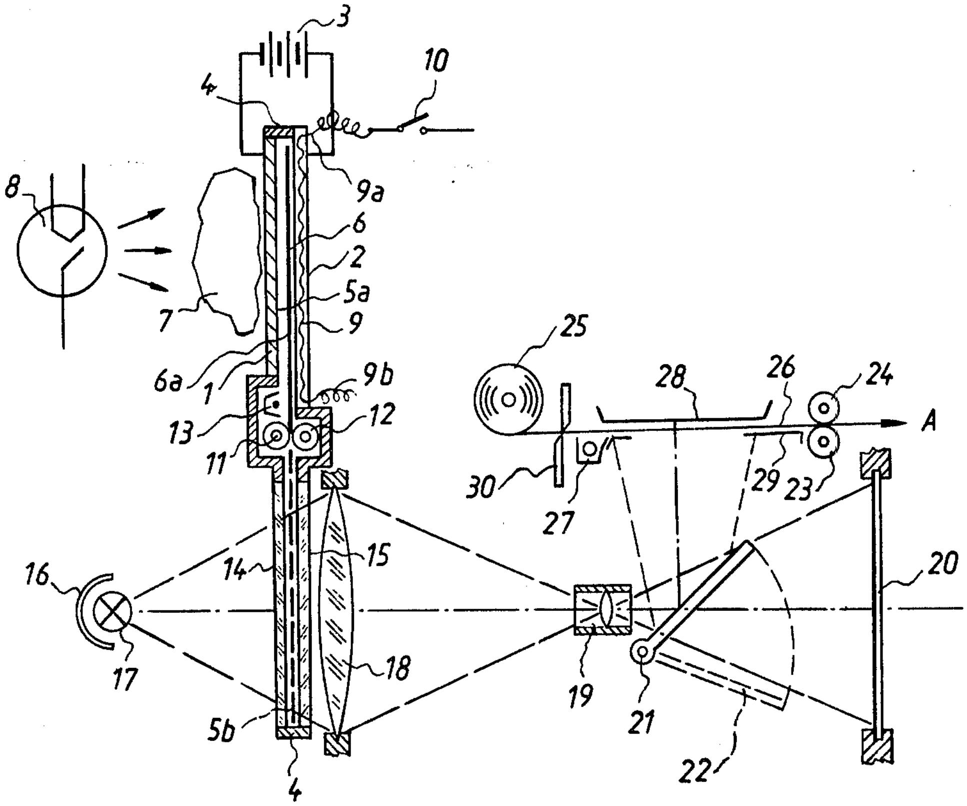
3
4
10
8
9a
6
2
5a
7
9
6a
1
9b
13
12
11
25
28
26
24
A
30
27
29
23
14
15
16
17
18
5b
4
19
21
22
20

RADIOGRAPHIC METHOD AND APPARATUS

BACKGROUND OF THE INVENTION

The present invention relates to a method and apparatus for making X-ray images without resorting to X-ray film, and more particularly to improvements in a radiographic method and apparatus of the type wherein a dielectric receptor sheet or an analogous insulating charge-receiving medium is placed into an interelectrode gap which is defined by the anode and the cathode of an ionography imaging chamber and contains a high Z gas. During imaging, the gas is maintained at an elevated (superatmospheric) pressure and serves to absorb incident X-rays.

In a radiographic apparatus of the above outlined character (reference may be had to U.S. Pat. No. 3,774,029 granted Nov. 20. 1973 to Muntz et al.), the compressed high Z gas (e.g., Freon or a noble gas such as Krypton or Xenon) plays the important role of absorbing X-rays to effect the generation of a charge by a quantum process, such as the photoelectric or Compton effect. The generation of charge takes place in an externally applied electric field between the electrodes and causes a latent electrostatic image to develop on the dielectric sheet which is located in the electric field during exposure to object-modulated X-rays. The thus obtained latent image is developed in a separate machine by resorting to an electrostatic technique including the deposition of toner particles. Prior to imaging, the dielectric sheet must be introduced into the imaging chamber (i.e., into the interelectrode gap). The procedure is reversed, i.e., the sheet which carries a latent image must be withdrawn from the imaging chamber, when the imaging step is completed.

In order to achieve a satisfactory yield as well as to reduce the exposure of patients or objects to X-rays, presently known imaging chambers are operated at a gas pressure of 6 to 20 atmospheres. The pressure must be reduced to atmospheric pressure prior to introduction of a fresh dielectric sheet as well as prior to withdrawal of a sheet which carries a latent image. This is achieved by causing a pump to transfer the high Z gas from the imaging chamber into a storage vessel. Such reduction of gas pressure in the imaging chamber prior and subsequent to exposure of successive dielectric sheets to X-rays is expensive and time-consuming. Moreover, the incoming dielectric sheet invariably entrains some air into the interelectrode gap to thereby dilute the high Z gas, and the outgoing sheet (which carries a latent image) invariably entrains some high Z gas during withdrawal from the imaging chamber so that a relatively high percentage of valuable high Z gas is lost. Losses in and/or dilution and contamination of high Z gas cannot be avoided because the clearance or clearances through which the dielectric sheet is introduced into or evacuated from the imaging chamber cannot be too narrow, i.e., at least that side of the sheet which is to be provided with or which already carries a latent image cannot be permitted to rub against one or more stationary seals. An ionography imaging chamber which is designed to prevent excessive dilution of and-/or losses in high Z gas is disclosed in the commonly owned copending application Ser. No. 720,577 filed Sept. 7, 1976 by Müller et al.

It was already proposed to render latent electrostatic images visible by coating one side of a sheet with a film of thermoplastic material which, when exposed to a charge in the interelectrode gap of an ionography imaging chamber, is provided with a so-called deformation image resulting from heating and resulting softening of the thermoplastic film. The deformation image is a relief image which is "frozen" into the sheet as soon as the thermoplastic film is allowed to harden.

OBJECTS AND SUMMARY OF THE INVENTION

An object of the invention is to provide a novel and improved method of making X-ray images on dielectric sheets.

Another object of the invention is to provide a novel and improved apparatus for the practice of such method.

A further object of the invention is to provide an apparatus which embodies an ionography imaging chamber and which is constructed and assembled in such a way that no gas is lost or diluted during introduction of dielectric sheets into or during removal of such sheets from the interelectrode gap of the imaging chamber.

An additional object of the invention is to provide a novel and improved dielectric sheet for use in the above outlined apparatus.

A further object of the invention is to provide an apparatus wherein one and the same sheet can be reused, again and again, without leaving the ionography imaging chamber.

An additional object of the invention is to provide the apparatus with novel and improved means for permitting observation and/or for making permanent records of the images of X-rayed objects.

A further object of the invention is to provide the apparatus with novel and improved means for erasing images from dielectric sheets which are held in the interelectrode gap of the ionography imaging chamber during exposure of an object to X-rays.

One feature of the invention resides in the provision of a method of making X-ray pictures and/or images. The method comprises the steps of confining a high Z gas in the interelectrode gap of an ionography imaging chamber; introducing into the gap a dielectric receptor sheet having a film which consists of thermoplastic material, heating the film to the softening point of the thermoplastic material, exposing the thus softened film to object-modulated X-rays whereby the film develops a relief image of the object, and rendering the relief image visible in accordance with the schlieren optical effect. The film is preferably heated by heating at least one of the electrodes which define the interelectrode gap, and the method further comprises the step of cooling the film subsequent to generation of the relief image so that such image is "frozen" into the film.

The method preferably further comprises the step of removing the sheet from the interelectrode gap subsequent to the cooling step (this step can be carried out without necessarily removing the sheet from the ionography imaging chamber). The step of rendering the relief image visible then includes directing a preferably highly oriented beam of light against the sheet outside of the interelectrode gap whereby the light which passes through the sheet (and/or the intercepted light) furnishes an image of the object. In accordance with a presently preferred embodiment of the method, the sheet is confined, in the course of exposure to light, in a second gas-filled gap which preferably communicates with the interelectrode gap and wherein the pressure of gas equals or approximates the pressure in the interelectrode gap.

The method may further comprise the step of producing a permanent record of the relief image, e.g., by making a photographic print or by resorting to an electrophotographic technique.

The sheet accumulates an electrostatic charge during exposure to object-modulated X-rays, and the method preferably further comprises the steps of neutralizing the charge and again heating the film to the softening point of the thermostatic material to thus erase the relief image. The sheet is then ready for exposure to X-rays which are modulated by a different object.

The heating step preferably comprises placing the dielectric sheet in direct contact with a heated surface of the imaging chamber, e.g., with one of the aforementioned electrodes which can be heated from within by an electric heating device. When the heating device is turned off, the thermoplastic film is cooled to "freeze" the relief image prior to transfer of the sheet into the second gap, i.e., into register with the means for rendering the relief image visible.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic partly elevational and partly sectional view of an apparatus which embodies the invention and includes means for making permanent records of the images of X-rayed objects.

DESCRIPTION OF THE PREFERRED EMBODIMENTS

The drawing shows an ionography imaging chamber having a flat housing or casing 4 wherein two electrodes 1 and 2 define an interelectrode gap 5*a*. The electrodes 1 and 2 are installed in the upper portion or section of the housing 4 and are connected to an external energy source 3 (e.g., 15 kV). The gap 5*a* is filled with a gas (e.g., Freon, Krypton or Xenon) having a high atomic or molecular number. During imaging, the confined gas is maintained at a pressure of 6–20 atmospheres superatmospheric pressure.

A dielectric receptor sheet 6 is shown adjacent that side of the electrode 2 which faces the electrode 1, an object 7 and a source 8 of X-rays. That side or surface of the receptor sheet 6 which faces the source 8 is provided with a film 6*a* of thermoplastic material. During imaging, electrons which develop in the gap 5*a* are accelerated in a direction toward the sheet 6 under the influence of the electric field which is established by the energy source 3. The electrons deposit on the sheet 6 which is thus provided with a latent image of the object 7.

The electrode 2 contains an electrically heated coil 9 whose ends are connected with conductors 9*a*, 9*b* and are connected in circuit with a suitable externally mounted energy source (not shown) in response to closing of a switch 10. When the switch 10 is closed, the electrode 2 heats the sheet 6 and its thermoplastic film 6*a*. When the temperature of the film 6*a* rises above the softening point of thermoplastic material, the film 6*a* undergoes a deformation which results in development of a relief image or deformation image corresponding to the image of the object 7.

As mentioned above, the electrodes 1 and 2 are installed in a first section of the housing 4 (this is the upper section, as viewed in the drawing). The second or lower section of the housing 4 comprises two light-transmitting walls or panes 14, 15 which are disposed at the opposite sides of a second gap 5*b* serving to receive the sheet 6 when the film 6*a* of such sheet carries a relief image. The means for transferring sheets 6 from the gap 5*a* into the gap 4*b* comprises two driven rolls 11, 12 which are mounted in an enlarged intermediate section of the housing 4 immediately adjacent a corona discharge device 13. The motor (not shown) which drives at least one of the rolls 11, 12 is reversible so that the sheet 6 can be transported from the gap 5*b* into the gap 5*a* or vice versa. The discharge device 13 is on when a sheet 6 is transported from the gap 5*b* back into the gap 5*a* between the electrodes 1 and 2. Such sheet is then provided with a uniform electrostatic charge before it is fully received in the gap 5*a*. If the sheet 6 is reheated, subsequent to neutralization of its image, to the softening point of thermoplastic material of the film 6*a*, the relief image on the sheet 6 is automatically erased. The pressure of high Z gas in the gap 5*b* preferably equals the pressure in the gap 5*a*.

The outer side of the pane 14 faces a light source (projection lamp) 17 which is mounted in front of a suitable reflector 16 and directs a strongly oriented beam of light against the sheet 6 in the gap 5*b*. A condenser lens 18 behind the pane 15 images the sheet 6 onto an objective 19 which projects the image onto an opal glass plate 20. Light which issues from the lamp 17 penetrates more readily through thinner and less dense portions of the film 6*a*. Any elevations at the exposed side of the film 6*a* produce darker areas on the glass plate 20. In other words, the optical system which includes the lamp 17 and lenses 18, 19 converts the relief image on the film 6*a* into a schlieren or density image which can be observed by looking at the plate 20.

If one desires to obtain a permanent record (print) of the density image, the apparatus which is shown in the drawing may further comprise means for projecting the relief image onto a recording medium. To this end, the apparatus comprises a mirror 22 which is pivotable about the axis of a fixed shaft 21 between the solid-line and broken-line positions. When in the broken-line (retracted) position, the mirror 22 allows the density image to reach the glass plate 20. When pivoted to the solid-line position, the mirror 22 reflects the relief image onto a web 26 whose image-receiving side is coated with a layer of ZnO. The web 26 is stored in the form of a supply reel 25 and is transported through the space between the components 28, 29 of a platform so that it can receive the reflected image which is projected through the window of the component 29. The web 26 is advanced at necessary intervals by driven rolls 23, 24 (see the arrow A) and is severed at intervals by a severing device 30 including a mobile knife and a stationary counterknife. A corona discharge device 27 applies a uniform charge to the underside of the web 26 (as viewed in the drawing) immediately ahead of the window in the component 29. After each actuation of the severing device 30, the advancing rolls 23, 24 are set in motion to transport the freshly separated portion of the web 26 into an electrophotographic developing machine, not shown.

It is clear that the web 26 constitutes but one form of means for facilitating the making of a permanent record of the X-ray image. For example, such web can be replaced with any other suitable light-sensitive material (e.g., photographic AgX recording medium).

The sheet 6 can be used again and again; all that is necessary is to neutralize the charge and to heat the thermoplastic material of the film 6a to the softening point so that the previously formed relief image disappears.

The improved apparatus exhibits many important advantages. Thus, once the material of the film 6a hardens, it offers a highly satisfactory resistance to mechanical deforming stresses and (unlike a latent image) can be readily transported through the nip of the rolls 11, 12 or through a very narrow clearance (if necessary) from the interior of the housing 4.

Another important advantage of the improved apparatus is that, as long as one uses one and the same sheet 6 for the making of successive images, the housing 4 can remain hermetically sealed so that the expensive high Z gas cannot escape into the surrounding atmosphere and cannot be diluted by air.

It is clear that the heating means 9 need not be installed in the interior of an electrode and/or that each of the electrodes 1, 2 can contain a heating device.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. A method of making X-rays images, comprising the steps of confining a high Z gas in the interelectrode gap of an ionography imaging chamber; introducing into the gap a dielectric receptor sheet having a film consisting of thermoplastic material; heating said film to the softening point of said material; exposing the thus softened film to object-modulated X-rays whereby the film develops a relief image of the object; and rendering said relief image visible in accordance with the schlieren optical effect, including transferring the sheet from said interelectrode gap into a second gap which communicates with said interelectrode gap and which is also filled with said high Z gas whereby the pressure of such gas in said second gap equals the pressure in said interelectrode gap, and directing a beam of light against the sheet in said second gap.

2. A method as defined in claim 1, further comprising the step of cooling said film subsequent to development of said relief image.

3. A method as defined in claim 1, further comprising the steps of transferring said sheet from said second gap into said interelectrode gap, neutralizing the charge of said sheet in the course of said last mentioned transporting step, and again heating said film to the softening point of said material to thus erase said relief image.

4. A method as defined in claim 1, wherein said heating step comprises placing said sheet in direct contact with a heated surface of said chamber.

5. A method as defined in claim 1, further comprising the step of producing a permanent record of said relief image.

6. A method as defined in claim 5, wherein said permanent record is a photographic print.

7. A method as defined in claim 5, wherein said record is produced in accordance with an electrophotographic technique.

8. Apparatus for making X-ray images, comprising an ionography imaging chamber including a pair of electrodes defining an interelectrode gap which contains a high Z gas, said chamber further including two light-transmitting walls defining a second gap which communicates with said interelectrode gap so that said second gap is also filled with said high Z gas and the pressure of such gas in said second gap equals the pressure in said interelectrode gap; a dielectric receptor sheet disposed in said chamber and having a film of thermoplastic material; means for transporting said sheet between and into said gaps; means for heating said film to the softening point of said material while said sheet is located in said interelectrode gap whereby said film develops a relief image of an X-rayed object when exposed to object-modulated X-rays; and means for rendering said relief image visible in accordance with a schlieren optical effect while said sheet is located in said second gap.

9. Apparatus as defined in claim 8, further comprising means for producing a permanent record of said relief image.

10. Apparatus as defined in claim 9, wherein said record producing means includes means for producing photographic prints.

11. Apparatus as defined in claim 9, wherein said record producing means comprises means for recording the relief image in accordance with an electrophotographic technique.

12. Apparatus as defined in claim 8, further comprising means for neutralizing, during transport of said sheet into said interelectrode gap, the electrostatic charge which said sheet accumulates as a result of exposure to object-modulated X-rays.

13. Apparatus as defined in claim 12, wherein said neutralizing means comprises a corona discharge device adjacent the path of movement of said sheet into and out of said interelectrode gap in the proximity of said transporting means.

14. Apparatus as defined in claim 8, wherein said heating means includes a device which is operable to heat at least one of said electrodes.

15. Apparatus as defined in claim 8, wherein said means for rendering said relief image visible is in register with said walls.

16. Apparatus as defined in claim 15, wherein said means for rendering said relief image visible includes a light source outwardly adjacent one of said walls and an optical system for the light which passes through said one wall, through the sheet between said walls, and through the other of said walls.

17. Apparatus as defined in claim 16, wherein said source includes a projection lamp arranged to furnish a sharply oriented light beam.

* * * * *